(12) United States Patent
Radzikh

(10) Patent No.: US 11,692,513 B2
(45) Date of Patent: Jul. 4, 2023

(54) ELECTRIC JET ENGINE

(71) Applicant: Yuriy Radzikh, Jenkintown, PA (US)

(72) Inventor: Yuriy Radzikh, Jenkintown, PA (US)

( * ) Notice: Subject to any disclaimer, the term of this patent is extended or adjusted under 35 U.S.C. 154(b) by 9 days.

(21) Appl. No.: 17/453,032

(22) Filed: Nov. 1, 2021

(65) Prior Publication Data

US 2023/0133959 A1 May 4, 2023

(51) Int. Cl.
*F02K 5/00* (2006.01)

(52) U.S. Cl.
CPC ........................... *F02K 5/00* (2013.01)

(58) Field of Classification Search
CPC .......... F02K 5/00; F03H 1/0081; F04D 25/06; F04D 25/0606; F04D 25/0633; F04D 25/064; F04D 25/0646; F04D 29/325; F04D 29/326; B64D 27/24; B64D 2027/026; F01D 15/00; F01D 15/10; F05D 2220/76; F05D 2220/766; F05D 2220/768
USPC ........................................................ 417/356
See application file for complete search history.

(56) References Cited

U.S. PATENT DOCUMENTS

| | | | | |
|---|---|---|---|---|
| 5,484,266 A * | 1/1996 | Murga | ................... | B63H 11/08 417/42 |
| 6,527,521 B2 * | 3/2003 | Noda | ................. | F04D 13/0646 604/151 |
| 7,032,859 B2 * | 4/2006 | Mohr | .................... | H02K 16/02 244/12.3 |
| 7,952,244 B2 * | 5/2011 | Colin | ...................... | F01D 15/10 310/67 R |
| 7,973,421 B2 * | 7/2011 | Sharp | ...................... | F01D 15/10 310/58 |
| 8,464,511 B1 * | 6/2013 | Ribarov | ................... | H02K 7/14 60/268 |
| 9,143,023 B1 * | 9/2015 | Uskert | ................... | H02K 99/20 |
| 11,255,216 B2 * | 2/2022 | Chong | ..................... | H02K 1/12 |
| 2004/0042916 A1 * | 3/2004 | Masterton | ............. | F04D 25/066 417/423.7 |
| 2010/0236849 A1 * | 9/2010 | Wishart | ............... | B60K 7/0007 310/115 |
| 2011/0138765 A1 * | 6/2011 | Lugg | ......................... | F02K 1/08 310/90.5 |
| 2017/0226866 A1 * | 8/2017 | Nishimura | ................ | F01D 5/20 |
| 2018/0010467 A1 * | 1/2018 | Zhang | ..................... | F01D 5/225 |
| 2018/0127103 A1 * | 5/2018 | Cantemir | .................. | F02C 7/32 |

(Continued)

*Primary Examiner* — Ehud Gartenberg
*Assistant Examiner* — Henry Ng
(74) *Attorney, Agent, or Firm* — Douglas J. Ryder; Ryder, Mazzeo & Konieczny LLC

(57) ABSTRACT

Electric engine to provide thrust to fly an aircraft. Engine includes housing, air inlet, shaft, bladed rotor having a plurality of magnets secured on shaft, stator having plurality of coils positioned so as to interact with plurality of magnets and an exhaust nozzle. Powering coils causes interaction with magnets that results in bladed rotor rotating and pressurizing and accelerating air received via air inlet and expelling via exhaust nozzle to provide thrust. Engine may include generator having stator with coils secured to shaft via bearings and plurality of rotors with magnets secured to shaft to rotate with shaft. Magnets rotating past coils results in electric generation. Second hollow shaft may be mounted to shaft with bearings and generator may be located with hollow shaft. Second bladed rotor may be connected to, and rotate, second shaft. Engine may include ducts external to bladed rotor and fan to route air therein.

16 Claims, 17 Drawing Sheets

(56) References Cited

U.S. PATENT DOCUMENTS

| | | | |
|---|---|---|---|
| 2018/0281931 A1* | 10/2018 | Miller | F01D 15/10 |
| 2018/0355727 A1* | 12/2018 | Walunj | F01D 5/225 |
| 2019/0078455 A1* | 3/2019 | Jung | F01D 11/006 |
| 2019/0323363 A1* | 10/2019 | Sippel | F01D 5/288 |
| 2020/0052570 A1* | 2/2020 | Holcomb | B64D 27/20 |
| 2020/0198792 A1* | 6/2020 | Joshi | F02C 6/00 |
| 2021/0324802 A1* | 10/2021 | Bonnoitt | F04D 19/026 |
| 2022/0228505 A1* | 7/2022 | Simonetti | F02C 6/20 |
| 2022/0235726 A1* | 7/2022 | Greifelt | H02K 7/183 |

* cited by examiner

ELECTRIC JET ENGINE

BACKGROUND

Jet engines work by burning fuel in air to release hot exhaust gases. Accordingly, jet engines are often referred to as gas turbines. There are various types of gas-powered jet engines but they share five key components: an inlet, a compressor, a combustion chamber, and a turbine.

FIG. 1 illustrates a side view of an example gas-powered jet engine known as a turbojet. At the front of the turbojet, cold air is received via the inlet. The compressor (which may be made up of one or more fans) compresses the received air, which significantly increases the pressure and temperature thereof (e.g., pressure of the compressed air may be 8 times that of the received air). A fuel tank in the jet's wing sprays fuel into the combustion chamber of the engine. The compressed air is also provided to the combustion chamber. In the combustion chamber, the fuel mixes with the compressed air and ignites. The burning mixture produces hot exhaust gases (e.g., a temperature of about 1650° F.). A constant flow of air and fuel allows for continuous combustion.

The exhaust gases are provided to the turbine and cause a set of turbine blades to spin like a windmill (convert energy from exhaust gas to mechanical energy). The turbine blades are connected to a long axle that runs the length of the engine. The axle is also connected to the compressor, so that the mechanical energy generated by the spinning of the turbine blades also causes the compressor to turn. The hot exhaust gases exit through an exhaust nozzle. The tapering design of the exhaust nozzle helps accelerate the gases (e.g., over 1300 mph). The exit of the hot exhaust via the exhaust nozzle is used to thrust the jet forward.

FIG. 2 illustrates a side view of an example gas-powered jet engine known as a turbofan. In the turbofan air moves through two parts of the engine. A first stream of air flows through the core of the engine (compressor, combustion chamber, turbine) while the rest, called bypass air, flows around the core. The turbofan includes a duct fan that routes some of the air (the bypass air) through ducts formed around the core. The duct fan accelerates the bypass air flowing around the core to produce additional thrust. Thus, the turbofan gets some of its thrust from the hot exhaust generated by the core and some of its thrust from the bypass air. Low-bypass turbofans send virtually all their air through the core, while high-bypass turbofans send more air around it. The ratio of the air that goes around the engine to the air that goes through the core is called the bypass ratio.

BRIEF DESCRIPTION OF THE DRAWINGS

The features and advantages of the various embodiments will become apparent from the following detailed description in which.

DETAILED DESCRIPTION

Electric motors are becoming more widely used today. Utilizing an electric motor in a jet engine (turbine) could enable jets to fly without the need for a combustion chamber and/or gas. The electric engine may include a plurality of rotors rotating around a shaft. Each of the rotors may include a plurality of blades that enable air to traverse thereby. The rotors may include magnets on edges thereof. A stator may be created within the engine with coils oriented in alignment with the rotors. The coils could be operated so as to cause the rotors to rotate within the engine. The coils may be powered by either DC or AC power provided to the engine and controlled by a controller. The rotors rotating may pressurize the air and provide the thrust needed to power the jet.

Figure 3:
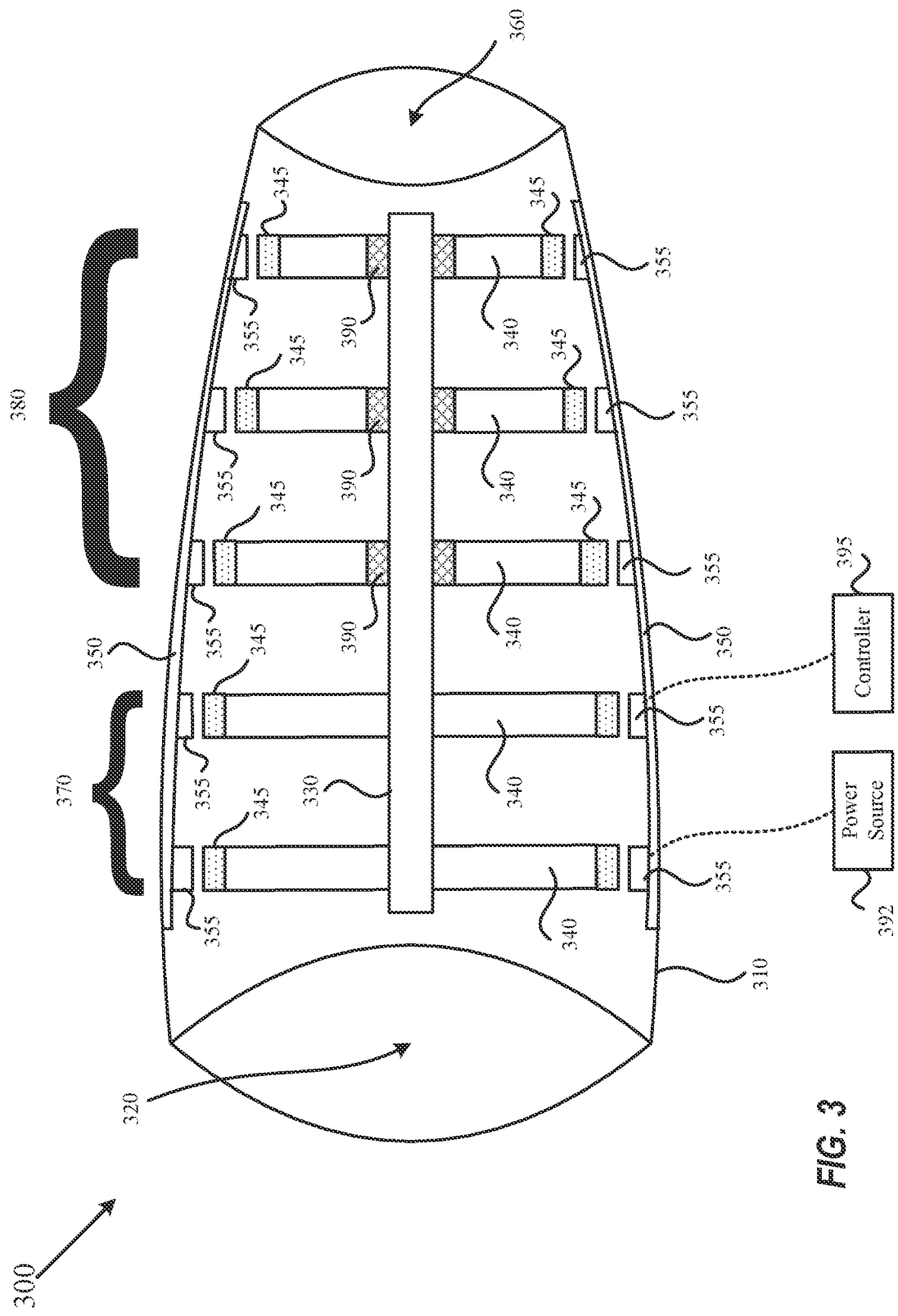
FIG. 3 illustrates a side view of an example electric jet engine, according to one embodiment.

FIG. 3 illustrates a side view of an example electric jet engine 300. The jet engine 300 is comparable to the turbojet of FIG. 1 since all the air passes through a core thereof. The electric jet engine 300 includes a housing 310, an air inlet 320, a shaft 330, a plurality of bladed rotors 340, a stator 350 having a plurality of coils 355 formed therein (e.g., formed in protrusions in the stator) and an exhaust nozzle 360. As illustrated, the stator 350 is secured to an interior of the housing 310. In an alternative embodiment, the housing 310 could act as the stator (e.g., coils could be formed in protrusions directly secured to the housing). The coils 355 may be powered by a power source 392 (only a linkage to one coil 355 shown for ease of illustration) and the operation thereof may be controlled by a controller 395 (only a linkage to one coil 355 shown for ease of illustration). The power source 392 may be a DC power source (e.g., battery) or an AC power source. The blades of the bladed rotors 340 include magnets 345 on ends thereof so that the interaction of the magnets 345 and the coils 355 cause the bladed rotors 340 to rotate.

A first set of bladed rotors (2 illustrated but not intended to be limited thereto) 370 may be connected to the shaft 330 and cause the shaft 330 to rotate. The first set of bladed rotors 370 may be the same so that they rotate at the same speed and together act as a low-pressure turbine that takes the air received from the inlet and compresses it to increase the pressure thereof (act as compressor of a typical gas-powered jet engine). The rotation of the shaft 330 may be utilized to power other devices via either the mechanical energy or the mechanical energy may be converted to electrical energy (e.g., via a generator). The electric power created by the generator could be used to power other items including possibly the motor 300.

A second set of bladed rotors (3 illustrated but not intended to be limited thereto) 380 may be connected to the shaft 330 via bearings 390 so that they rotate around the shaft 330 and not with the shaft 330. With this arrangement, the second set of bladed rotors 380 are not limited to rotating at the same speed as the shaft 330 or of each other. Accordingly, the second set of bladed rotors 380 may be different than the first set 370 (as illustrated the only visible difference is size and use of bearings 390). Additionally, each of the second set of bladed rotors 380 may be different from each other in number, size, shape and/or orientation of the blades as well as size and strength of magnets 345 (differences between the various bladed rotors within the second set 380 are not readily apparent as illustrated). The second set of bladed rotors 380 act as a high-pressure turbine and further increase the pressure of the air and provide the thrust for the jet (act as turbine of typical gas jet engine).

The use of the magnets 345 and the coils 355 causes the rotors 340 to rotate within the engine 300. When the polarity (not illustrated) of the magnets 345 is opposite from the polarity (not illustrated) of the coils 355, the magnets 345 are pulled toward the coils 355 and when the polarities are the same the magnets 345 are pushed away from the coils 355. During operation, the coils 355 may be pushing magnets 345 having the same polarity while pulling magnets 345 having different polarities at the same time. The pushing and pulling of the magnets 345 by the coils 355 causes the rotors 340 to rotate around the shaft 330.

It should be noted that the side view only illustrates what appears to be a single blade extending upward and a single blade extending downward from the shaft (or a single blade extending upward and downward) for each rotor 340 and only a single coil 355 on the top and bottom of the engine 300 in alignment with each rotor 340. The example electric jet engine 300 is in no way intended to be limited thereto. Rather, various numbers of blades and coils 355 could be utilized without departing the current scope. Furthermore, the magnets 345 at the end of the blades are simply illustrated as passing in close proximity to the coils 355. The example electric jet engine 300 is not limited thereto as other arrangements may be utilized (will be discussed in more detail later). Furthermore, the example jet engine 300 is not limited to the number of rotors 340 illustrated (2 in the first set 370 directly connected to shaft and 3 in the second set 380 connected to the shaft via bearings 390) but can be various numbers without departing the current scope. The number and strength of the magnets 345 may determine the number of rotors 340 needed.

Figure 4A:
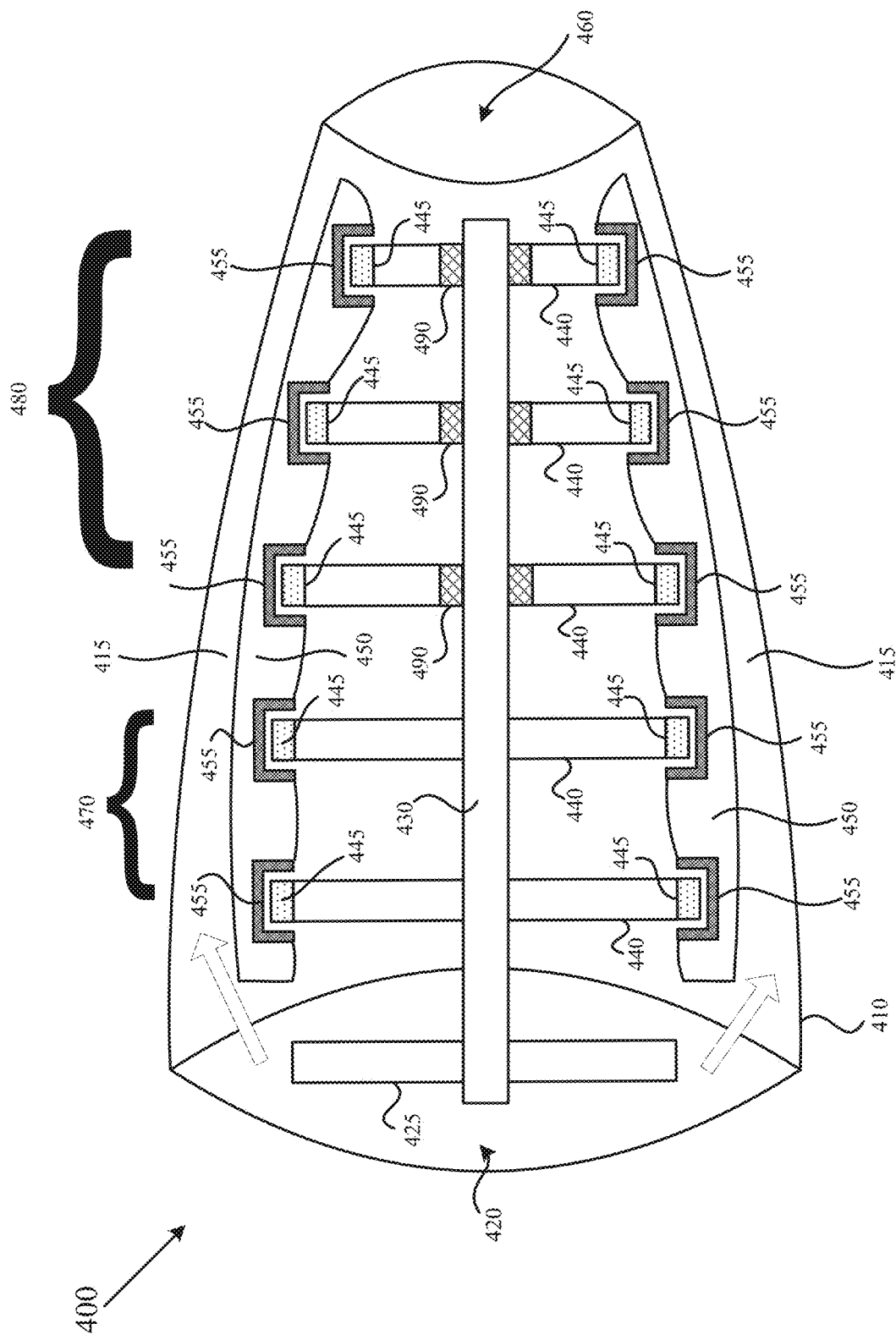
FIGS. 4A-B illustrate side views of example electric jet engines including bypass ducts, according to one embodiment.

FIG. 4A illustrates a side view of an example electric jet engine 400 having air flows through different parts thereof. The jet engine 400 is comparable to the turbofan of FIG. 2 where some air passes through a core of the engine and some air passes through ducts around the core. The electric jet engine 400 includes a housing 410, an air inlet 420, a shaft 430, a fan 425, a stator 450 having a plurality of coils 455 formed therein, a plurality of bladed rotors 440, air ducts 415 to enable air to be routed around the core (the bladed rotors 440) and an exhaust nozzle. The stator 450 is secured within the housing 410 and is separated from the housing 410 so that the air ducts 415 are formed between the stator 450 and the housing 410. The fan 425 is located within the air inlet 420 and routes some of the air (bypass air) into the ducts 415 and around the core. The fan 425 accelerates the bypass air flowing around the core to produce additional thrust. Thus, the electric jet engine 400 gets some of its thrust from the exhaust generated by the core (bladed rotors 440) and some of its thrust from the bypass air. The ratio of the air that goes around the core to the air that goes through the core is called the bypass ratio (e.g., low-bypass engines send more air through the core while high-bypass engines send more air around the core).

As illustrated, the stator 450 includes a plurality of indents having the coils 455 formed on the sides thereof. The blades of the bladed rotors 440 include magnets 445 on ends thereof so that the magnets 445 pass through the indents and the coils 455 located therewithin and the interaction of the magnets 445 and the coils 455 cause the bladed rotors 440 to rotate. As illustrated, a first set of bladed rotors 470 (2 illustrated but not intended to be limited thereto) may be connected to the shaft 430 and cause the shaft 430 to rotate and a second set of bladed rotors 480 (3 illustrated but not intended to be limited thereto) may be connected to the shaft 430 via bearings 490 so that they rotate around the shaft 430 and not with the shaft 430. The rotation of the shaft 430 may be utilized to power the fan 425 and possibly other devices. As illustrated the fan 425 is connected to the shaft 430 and thus rotates with the shaft 430. The engine 400 is not limited thereto as gears or the like may be utilized to use the mechanical energy of the shaft 430 to rotate the fan 425 at a different speed. Alternatively, or in addition, the rotation of the shaft 430 (mechanical energy) may be converted to electrical energy (via a generator). The electric power created by the generator could be used to power other items including possibly the motor 400.

It should be noted that the side view only illustrates what appears to be a single blade extending upward and downward from the shaft for each rotor 440, a stator 450 located on a top and bottom of the engine 400 with an indent with coils 455 in alignment with each rotor 440, and ducts 415 on only a top and bottom of the engine 400. The example electric jet engine 400 is in no way intended to be limited thereto. Rather, various numbers of blades could be utilized on the rotors 440 and the stator 450 and corresponding ducts 415 formed could be located around whole circumference of the engine 400. Moreover, various numbers and location of the indents and associated coils 455 around the circumference of the stator 450 could be utilized or the coils 455 could be formed in other manners (e.g., on protrusions in the stator) without departing the current scope. Furthermore, the example electric jet engine 400 is not limited to the number of rotors illustrated (2 in the first set 470 directly connected to shaft and 3 in the second set 480 connected to the shaft via bearings 490) but can be various numbers without departing the current scope. The number and strength of the magnets 445 may determine the number of rotors 440 needed.

The example electric jet engines 300, 400 included a plurality of rotors 340, 440 having magnets 345, 445 in alignment with coils 355, 455 that rotate within the engine 300, 400 based on the interaction of the magnets 345, 445 and the coils 355, 455. The electric jet engine is in no way intended to be limited thereto. Rather, if the total magnetic power on a single rotor blade was sufficient a single rotor blade could be utilized without departing from the current scope. For example, if the diameter of the rotor blades where between 25" and 33" included magnets with total magnetic power between 9-12 tonnes (19000-26500 pounds), the rotation of the rotor would be sufficient to compress the air and provide the required thrust. The power transferred to the shaft 330, 430 would be a few times more.

The mechanical energy provided to the shaft 330, 430 from the single rotor with sufficient magnetic power could be used to power other rotors (without magnets 345, 445) making up the low-pressure 370, 470 and/or high-pressure turbines 380, 480, fans (e.g., duct fan 425 in the inlet) and/or other items. The rotation of the shaft 330, 430 could be utilized to rotate the other items, and/or gears could be utilized to modify the speed of the shaft 330, 430 to a desired speed for the other items. Alternatively, or in addition to, the mechanical energy could also be utilized to convert to electrical power via a generator.

Figure 4B:
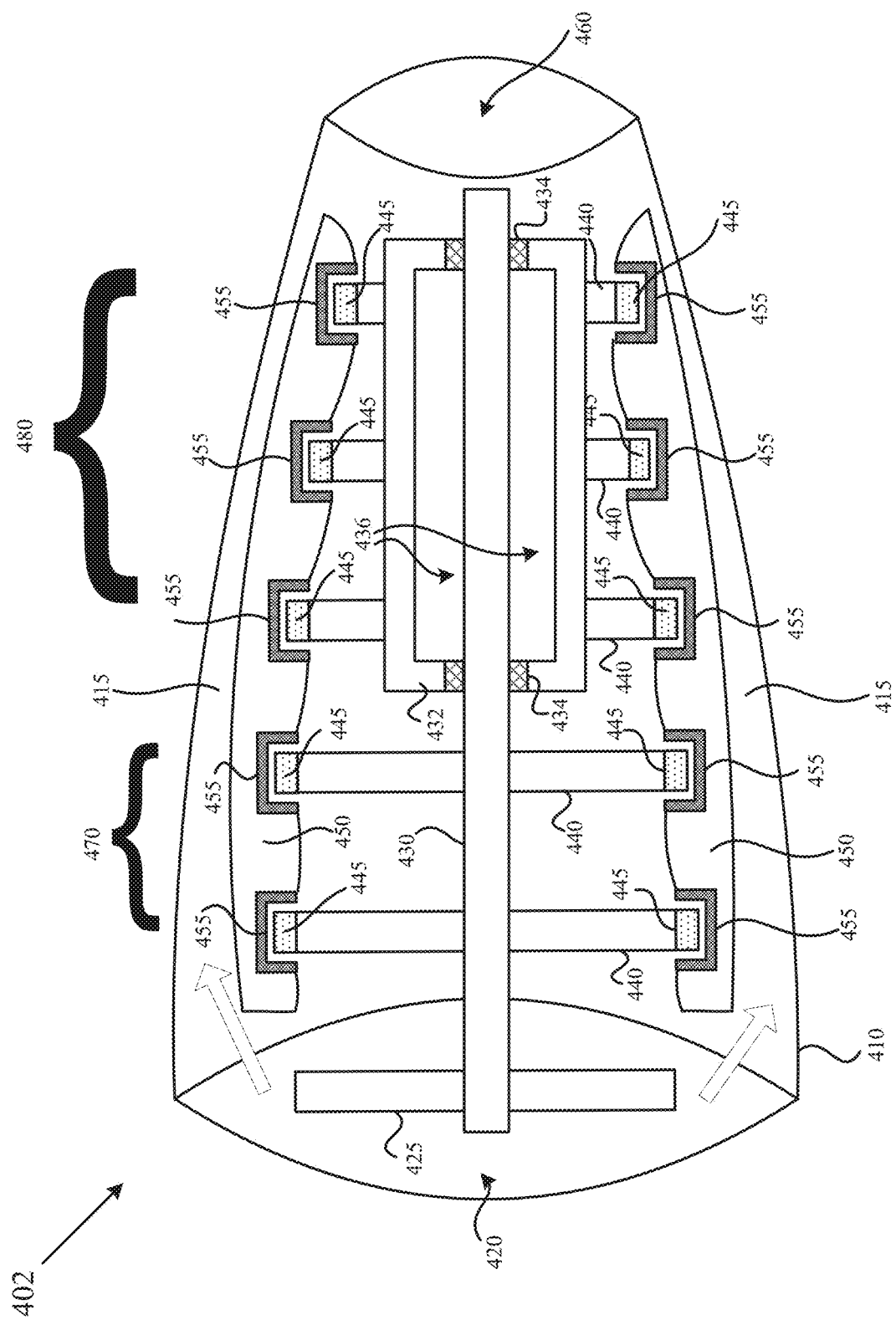

FIG. 4B illustrates a side view of another example electric jet engine 402 having air flowing through different parts thereof. The jet engine 402 is similar to the jet engine 400 of FIG. 4A. The major difference is that a second shaft 432 is included and the second set of rotors 480 that act as a high-pressure turbine are connected to the second shaft 432. The second shaft 432 may be connected to the shaft 430 with bearings 434 that enable the shaft 430 to rotate therewithin without rotating the second shaft 432. Alternatively, the second shaft 432 may rotate with the shaft 430, either at the same speed if connected directly to the shaft 430 or at a different speed if connected to the shaft 430 via gears or the like. The second set of rotors 480 may be connected to the second shaft 432 and cause the second shaft 432 to rotate therewith. Alternatively, one or more of the second set of rotors 480 may be connected to the second shaft 432 via bearings (not illustrated) so they rotate therearound.

The second shaft 432 may act to help route and condense the air flowing through the engine. The air may be routed around the second shaft 430 toward the stator 415. As illustrated, the second shaft 432 may be hollow so that there is room 436 between the interior of the second shaft 432 and the exterior of the shaft 430. The ends of the second shaft 432 may be connected to the shaft 430 via the bearings 434. Alternatively, the second shaft 432 may be solid with the exception of a hole to receive the shaft 430 so that an interior of the second shaft 432 and an exterior of the shaft 430 are in contact (e.g., via bearings). While not illustrated, the second shaft 432 could be utilized to turn other components (e.g., directly connected and thus turning at same speed, or connected via gears or the like so turning at a different speed).

The use of the different shafts (shaft 430 and second shaft 432) enables the rotors connected to each to rotate independently. That is, the first set 470 may be connected to the shaft 430 and the second set 480 may be connected to the second shaft 432. As such, one or more rotors 440 of the first set 470 may include magnets 445 that interact with coils 455 and cause the one or more rotors 440 to rotate which causes the shaft 430 to rotate as well as any other rotors 440 or other items directly connected to the shaft 430. Likewise, one or more rotors 440 of the second set 480 may include magnets 445 that interact with coils 455 and cause the one or more rotors 440 to rotate which causes the second shaft 432 to rotate as well as any other rotors 440 or other items directly connected to the second shaft 432.

Figure 5:
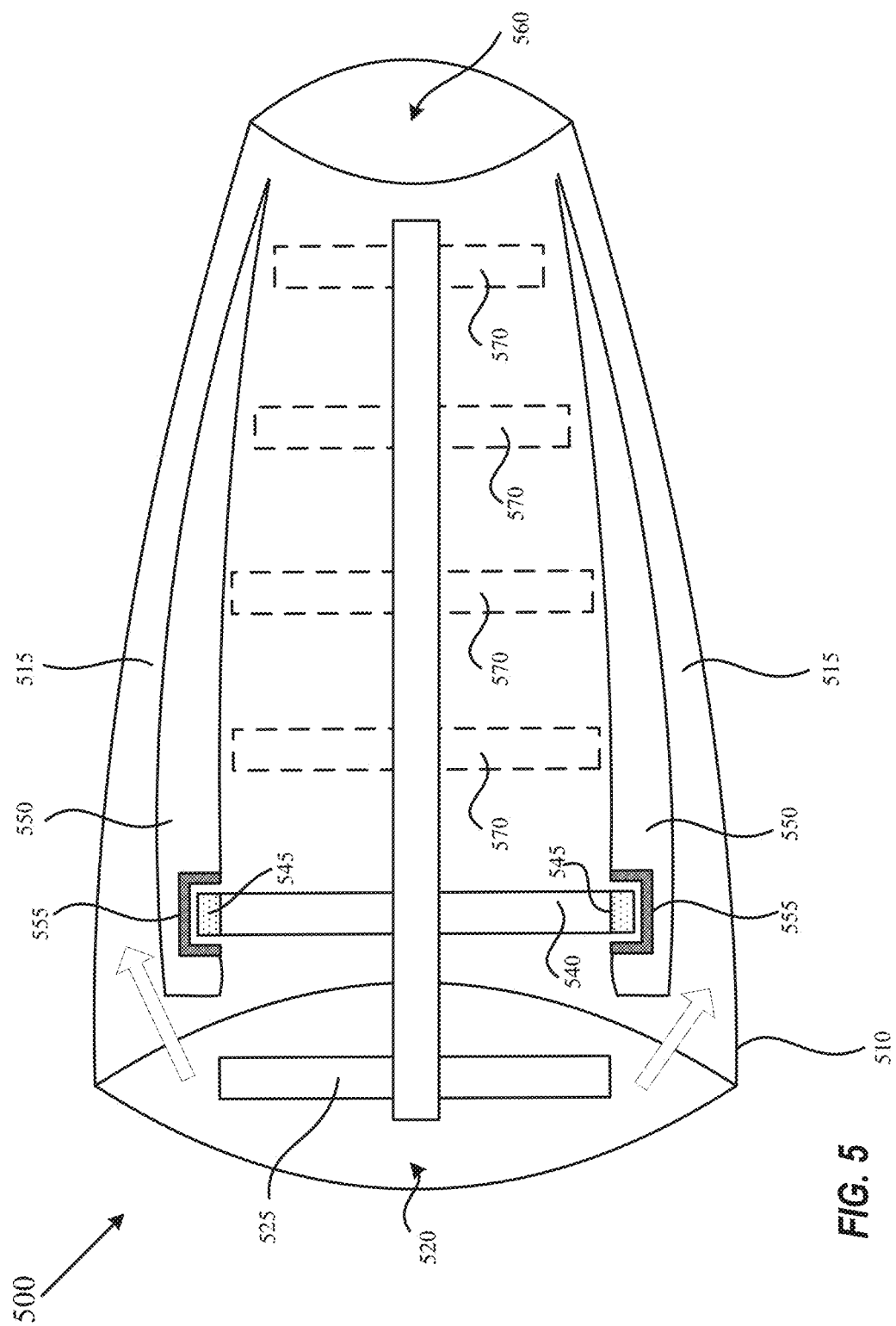
FIG. 5 illustrates a side view of an example electric jet engine with a single rotor, according to one embodiment.

FIG. 5 illustrates a side view of an example electric jet engine 500 with a single rotor. The electric jet engine includes a housing 510, an air inlet 520, a shaft 530, a duct fan 525, a bladed rotor 540 having magnets 545 at ends thereof, a stator 550 having a plurality of coils 550 in alignment with the bladed rotor 540, air ducts 515 to enable air to be routed around the core, an exhaust nozzle 560, and optionally one or mode additional fans 570 (within the core, after the rotor 540). The duct fan 525 routes and accelerates some of the air (bypass air) into the ducts 515 and around the core to produce additional thrust. The interaction between the magnets 545 on the blades of the rotor 540 and the coils 555 within the stator 550 generates the necessary power. The rotation of the rotor 540 causes the shaft 530 to rotate, and the rotation of the shaft 530 rotates the duct fan 525 as well as any additional fans 570 included. The optional additional fan(s) 570 may further compress and accelerate the air or may simply route the air to the outlet. As illustrated, the fan 525 and additional fans 570 are connected to the shaft 530 and thus rotate with the shaft 530. The engine 500 is not limited thereto as gears or the like may be utilized to modify the speed of the shaft 530 in order to rotate the fan 525 and additional fans 570 at a different speed.

It should be noted that the single rotor electric engine 500 is illustrated as an electric equivalent of a turbofan jet engine but is not limited thereto. Rather, the single rotor electric engine could be utilized as an electric equivalent of a turbojet jet engine without departing from the current scope. The mechanical energy of the shaft 530 could also be utilized to convert to electrical power via a generator. The electric power created by the generator could be used to power other items including possibly the motor 500.

Figure 6:
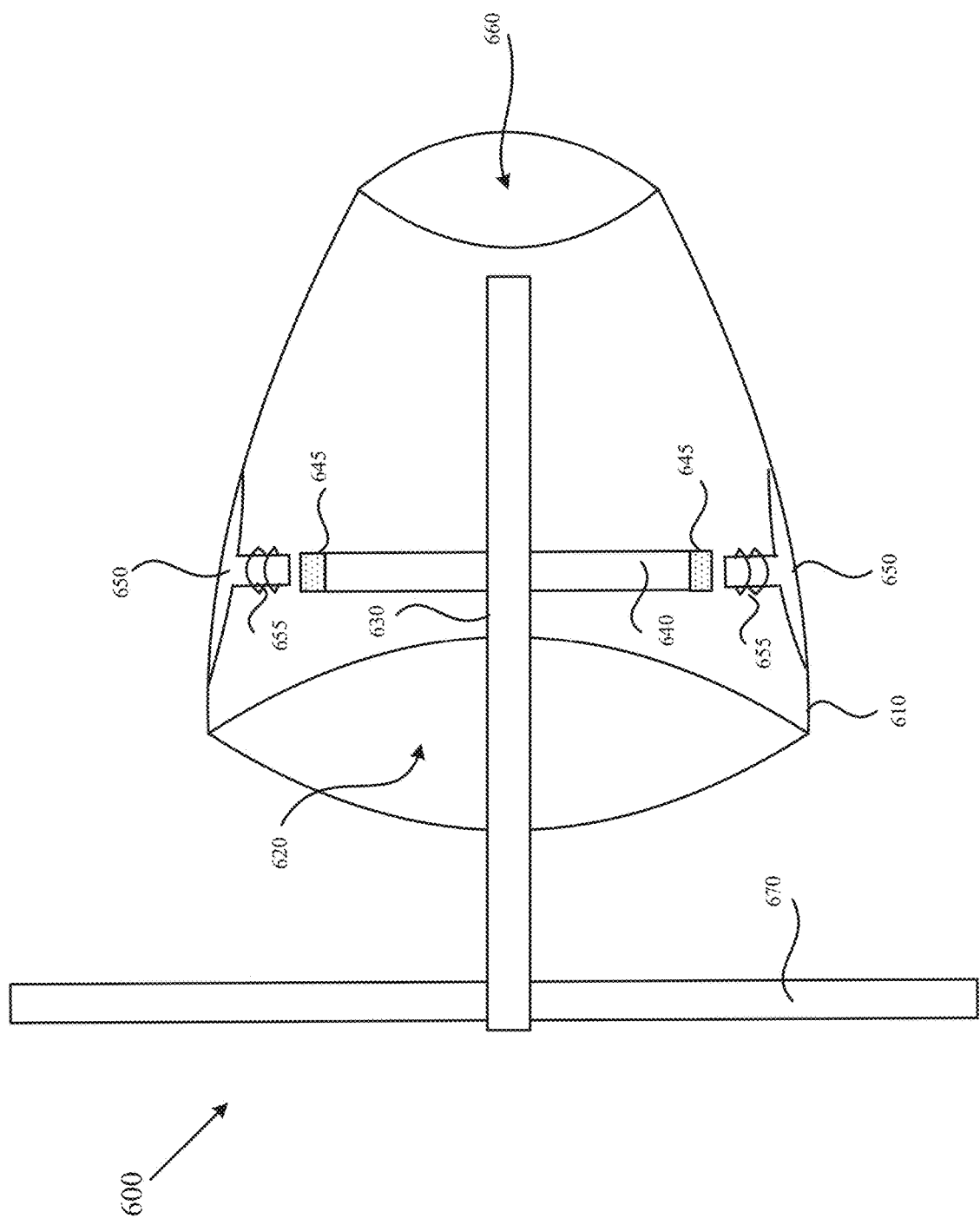
FIG. 6 illustrates a side view of an example electric jet engine with a single rotor and a propeller, according to one embodiment.

FIG. 6 illustrates a side view of an example electric jet engine 600 with a single rotor and a propeller (equivalent of a propeller engine). The electric jet engine 600 includes a housing 610, an air inlet 620, a shaft 630, a bladed rotor 640 with magnets 645 at ends thereof, a stator 650 having a plurality of coils 655 in alignment with the bladed rotor 640, an exhaust nozzle 660 and a propeller 670 having blades wider than the housing 610 to route and accelerate air therearound to produce thrust. The interaction between the magnets 645 on the blades of the rotor 640 and the coils 655 of the stator 650 generates the necessary power. The rotation of the rotor 640 causes the shaft 630 to rotate, and the rotation of the shaft 630 rotates the propeller 670 (either directly at same speed as shaft 630 or via gears or the like to modify the speed).

While not illustrated, additional fans may be included within the housing 610 and be rotated by the shaft 630. The mechanical energy of the shaft 630 could also be utilized to convert to electrical power via a generator. The electric power created by the generator could be used to power other items including possibly the motor 600.

The jet engines described above with respect to FIGS. 3-6 included bladed rotors having magnates at the ends thereof engaging with coils in a stator located outside of the rotors. While this configuration provides for the ability of the rotors to push the air therethrough, the configuration is not limited thereto. Rather, the jet engine could utilize other electric motor drive systems (e.g., known schemes of placing magnets and coils) without departing from the current scope so long as the air can pass therethrough.

According to one embodiment, a generator may be located within the electric jet engine housing so that the mechanical energy provided by the shaft can be easily provided to the generator in order for the generator to convert the mechanical energy to electric energy. The generator will have to be located such that it does not interfere with the airflow through the engine. The generator may be directly connected to the shaft of the electric engine. The radius of the generator may be much smaller that the radius of the rotors of the engine so that the generator does not interfere with the air flow.

Figure 7A:
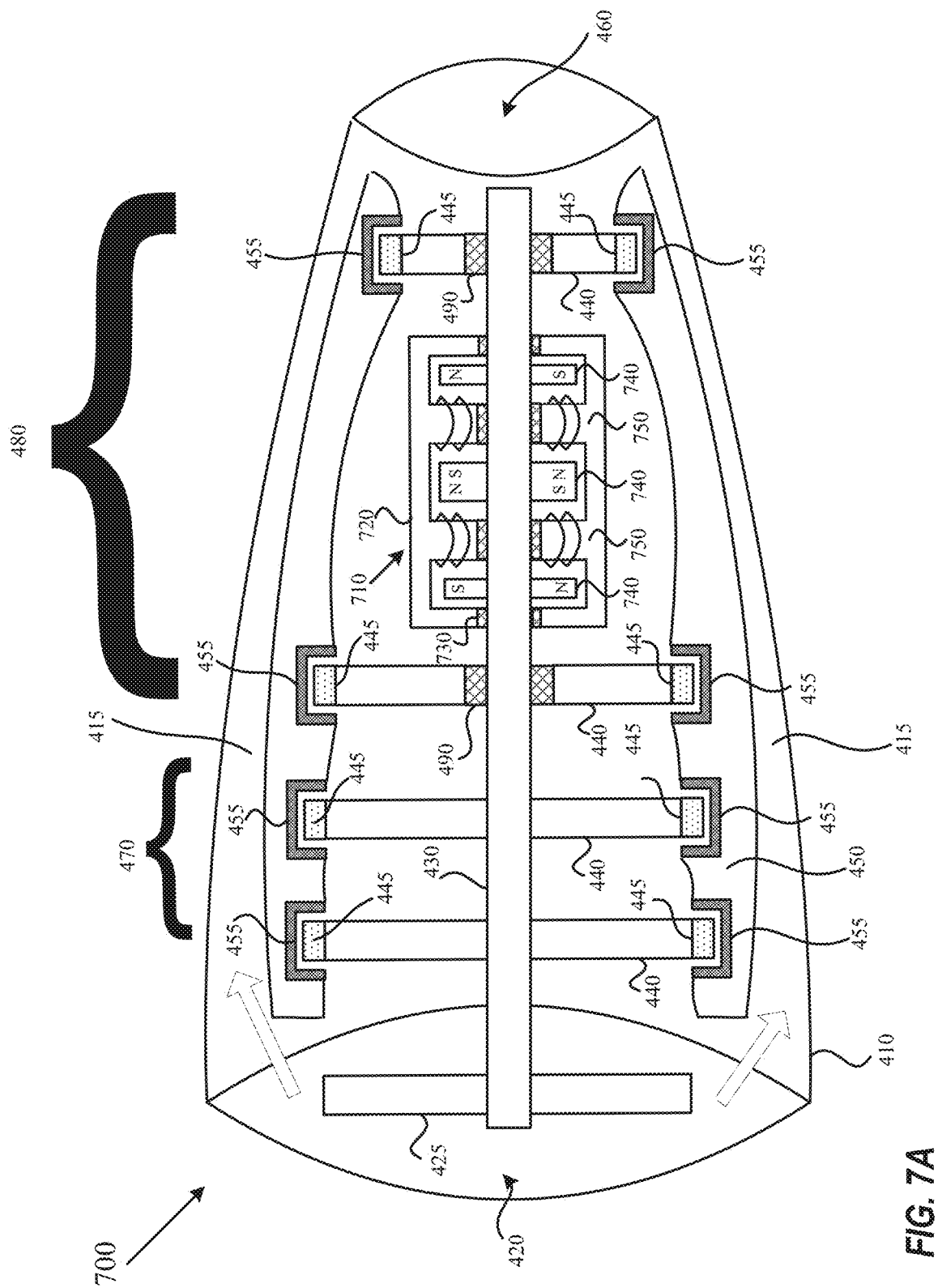
FIGS. 7A-B illustrate side views of example electric jet engines including a generator, according to one embodiment.

FIG. 7A illustrates a side view of an example electric jet engine 700 including a generator. The electric jet engine 700 is similar to the turbofan electric jet engine 400, so all like items are identified with like reference numbers. A generator 710 is added and is located between the second set of bladed rotors 480 that act as a high-pressure turbine. As illustrated, the second set of bladed rotors 480 only includes two bladed rotors 480 (one before and one after the generator 710) but is in no way intended to be limited thereby.

The generator 710 includes a housing 720 connected to the shaft via bearings 730 so that the shaft rotates within the housing 720 (the housing 720 does not rotate). Within the housing 720 there are alternating rotors 740 and stators 750. The rotors 740 include magnets 745 and the stators include coils 755. The rotors 740 are secured to the shaft 430 and rotate with the shaft 430. The stators 750 are connected to the shaft 430 via bearings so that the shaft 430 does not rotate the stators 750. For ease of illustration each bearing 730, magnet 745, and coil 755 are not labeled.

The rotors 740 facing each end of the housing only have magnets 745 on a single side (side facing stator 750), while the rotor 740 within the generator 710 that has a stator 750 on each side thereof includes magnets 745 on both sides of the rotor 740. The polarity of the magnets 745 on opposite sides of the rotor 740 will be opposite. The rotation of the shaft 430 causes the rotors 740 to rotate within the generator 710. As the rotors 740 rotate past the stators 750 and the magnets 745 past the coils 755, the interaction between the magnets 745 and the coils 755 will generate electricity in the coils 755. That is, as the alternating poles of magnets 745 pass the coil 755 it will cause current to flow in the coils 755.

It should be noted that the generator 710 was illustrated as including three rotors 740 (with only the central rotor 740 including magnets on each side) and two stators 750, but is in no way intended to be limited thereto. Rather, the number of rotors 740 and stators 750 may vary without departing from the current scope. The number of rotors 740 and stators 750 (and thus the length of the generator 710) may vary depending on, for example, the size (e.g., radius) of the rotors 740 and stators 750, the number and strength of the magnets 745, and the desired electric energy to be generated. Furthermore, the generator 710 is not limited to the configuration illustrated. Rather, other axial or radial schemes of rotor and stator placement within a generator could be utilized without departing from the current scope. In fact, any generator configuration having a diameter substantially smaller than a diameter of the engine (motor) it is operating with (and located within same housing as) is within the current scope. While not easily visible in the various figures because multiple rotors are illustrated in the engine and are spaced apart, the engine would likely be tall (large diameter) and slim (small length) while the generator operating therewith would likely ne short (small diameter) and wide (long length).

Furthermore, the location of the generator 710 is not limited to being between the second set of bladed rotors 480 that act as a high-pressure turbine as illustrated. Rather, the location can vary without departing from the current scope. In fact, multiple generators could be located within the engine without departing from the current scope. Moreover, the inclusion of the generator 710 is not limited to the turbofan electric motor as illustrated. The generator 710 could be included in any type of electric motor without departing from the current scope.

Figure 7B:
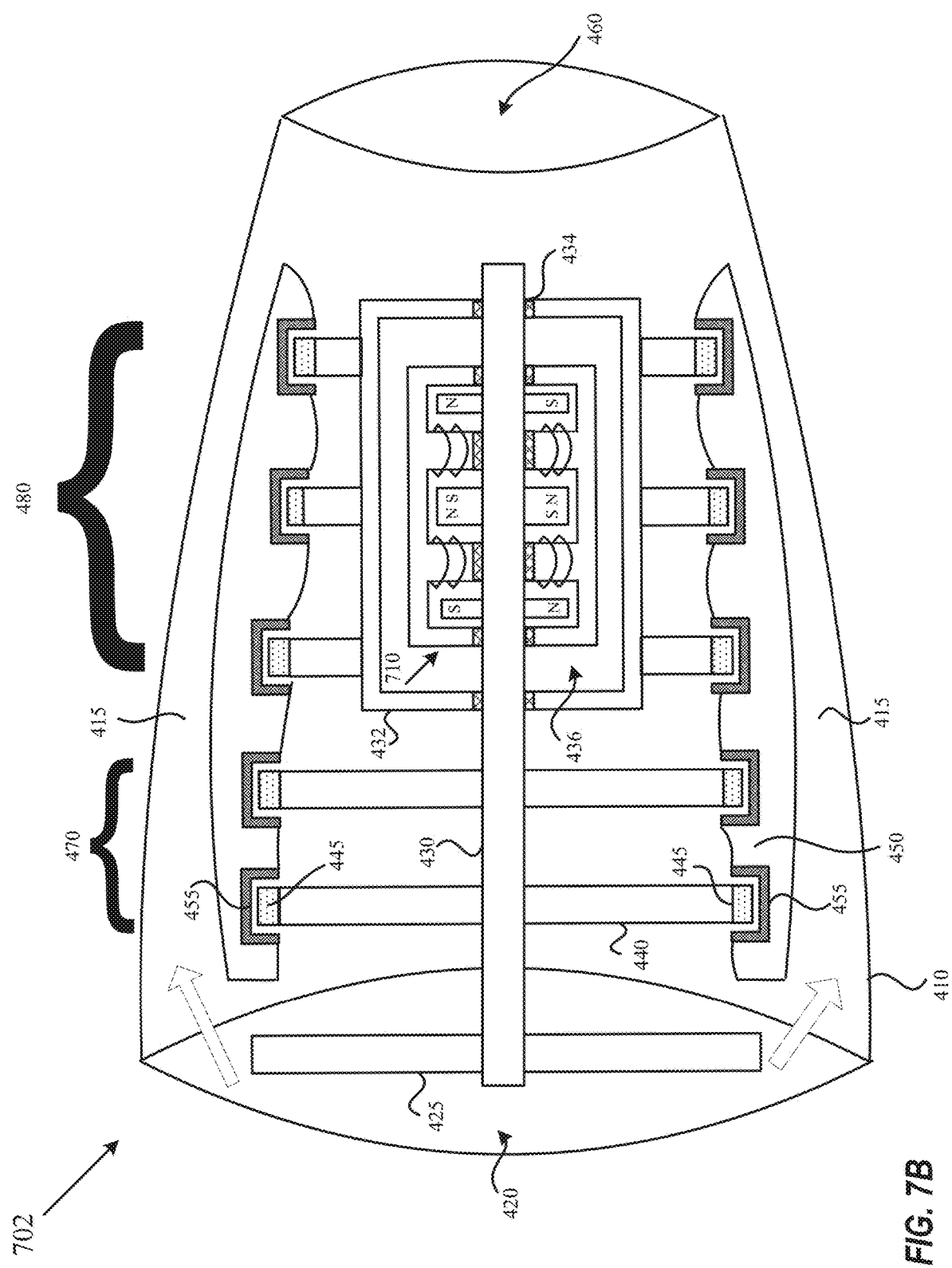

FIG. 7B illustrates a side view of another example electric jet engine 702 including a generator 710. The jet engine 702 is similar to the jet engine 700 of FIG. 7A. The major difference is that the second shaft 432 (such as that illustrated with respect to FIG. 4B) is included and the second set of rotors 480 that act as a high-pressure turbine are connected to the second shaft 432. The second shaft 432 has an open interior 436 and the generator 710 is located therewithin. The second set of bladed rotors 480 that act as a high-pressure turbine are secured to the second shaft 432. For ease of illustration many of the components that have previously been described and labeled are not separately labeled herein. The jet engine 702 is not limited to the configuration illustrated. Rather, the configuration of the engine 702 or the generator 710 could change without departing the current scope.

Figure 8:
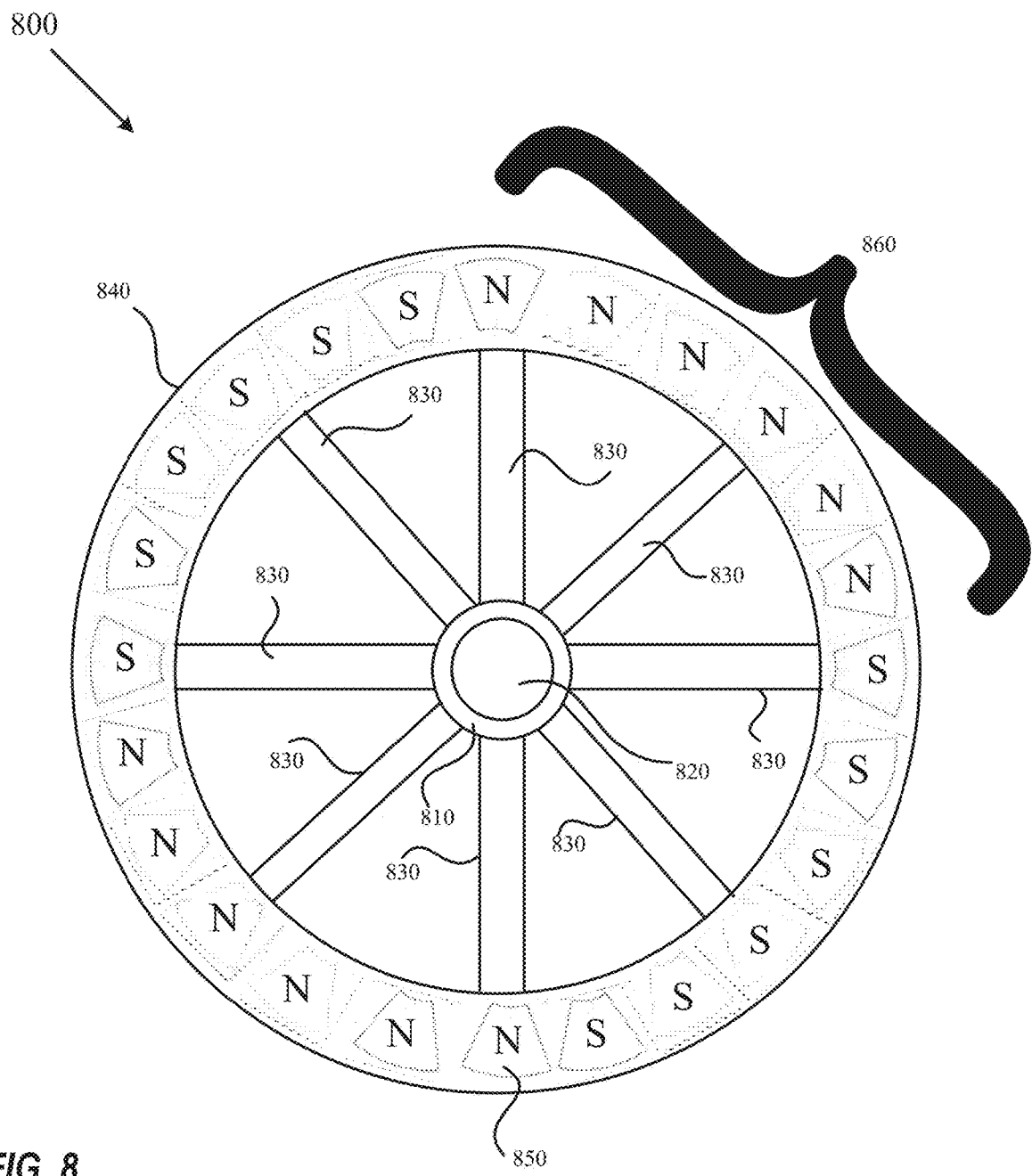
FIG. 8 illustrates an example bladed rotor that could be utilized in an electric jet engine, according to one embodiment.

FIG. 8 illustrates an example rotor 800 that could be utilized in an electric jet engine such as those illustrated in FIGS. 3-7. The rotor includes an inner ring 810 surrounding an opening 820 that receives the shaft, and a plurality of blades 830 (8 illustrated) extending from inner ring 810 to an outer ring 840. The blades 810 may be evenly spaced around the rotor 800 (evenly spaced around the inner and outer rings 810, 840). The outer ring 840 has magnets 850 located therearound that engage with the coils in a stator. The magnets 850 are organized in sectors 860 of same polarity magnets 850 (4 sectors with six magnets in each sector are illustrated). For ease of illustration only one magnet 850 and one sector 860 are identified.

The sectors 860 pass through, or by, sectors of coils and cause the rotor 800 to rotate within the engine. The number of blades 830 is not limited to 8 as illustrated. Rather, any number, size, location and orientation of blades may be utilized without departing the current scope. Furthermore, the number of sectors 860 is not limited to four as illustrated and the number of magnets 850 in each sector is not limited to 6. Rather, the number of sectors 860 can be any even number (e.g., 2, 4, 6, 8) and the number, size and strength of the magnets 850 can vary without departing the current scope. If the rotor 800 was utilized in a high-pressure portion (e.g., 380, 480) of an engine, the opening 820 may be larger so that bearings could be located therewithin so that the rotor 800 rotated around the shaft (as opposed to rotating the shaft).

The number of sectors of coils should match the number of sectors 860 of magnets 850 but may be spaced apart in order to assist in the rotation of the blades 830. A controller may be utilized to control the current flowing through the coils and the magnetic field produced thereby to assist in ensuring that the rotor 800 rotates in the desired direction and at the desired speed.

Figure 9:
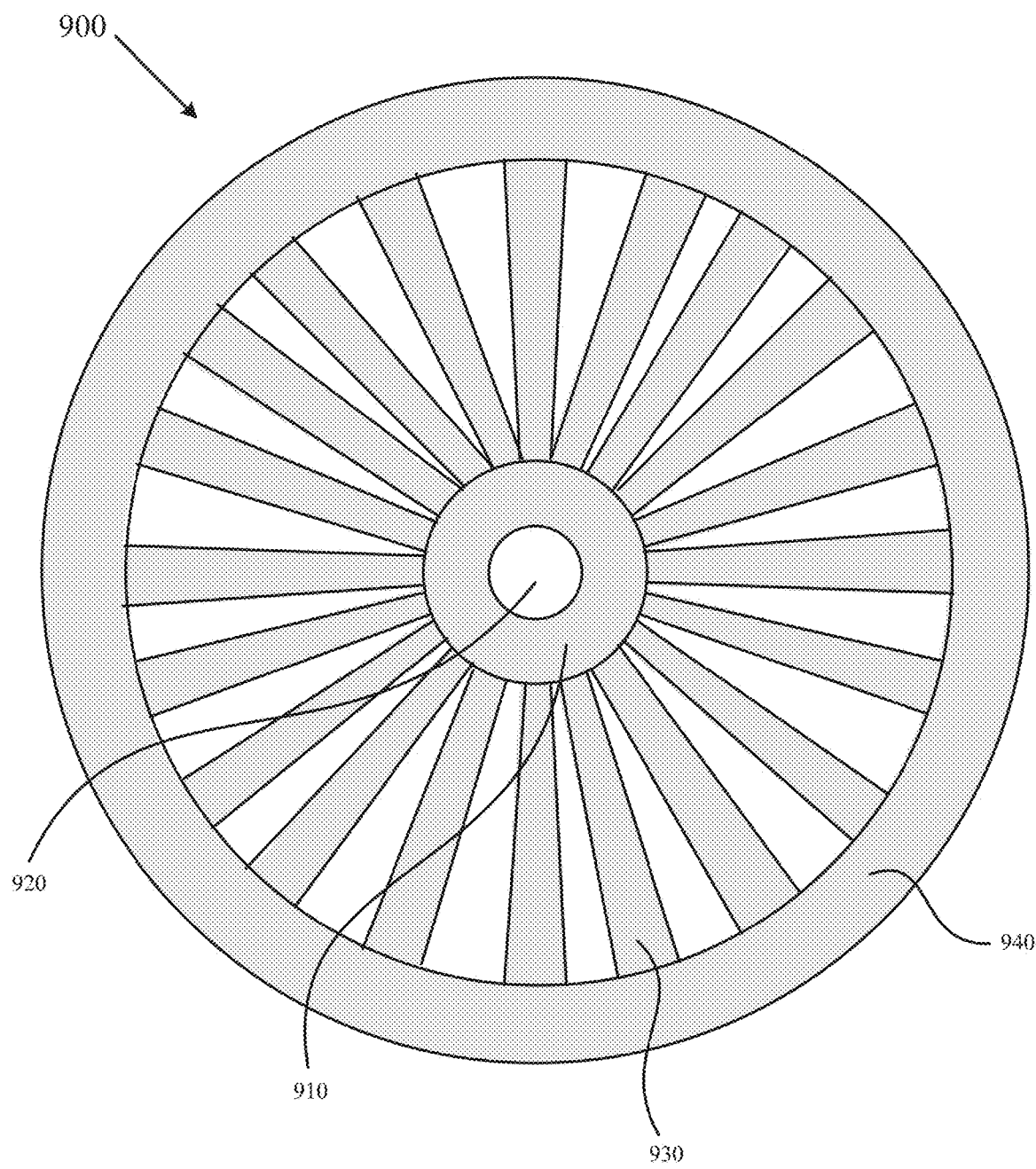
FIG. 9 illustrates an example bladed rotor that could be utilized in an electric jet engine, according to one embodiment.

FIG. 9 illustrates an example rotor 900 that could be utilized in an electric jet engine. The rotor 900 includes an inner ring 910 surrounding an opening 920, and a plurality of blades 930 extending from the inner ring 910 to an outer ring 940. The blades 930 may be shaped so as to provide better air flow. While not illustrated, magnets may be located on the outer ring 940, and they may be clustered in a similar fashion to that illustrated in FIG. 8. For ease of illustration only one blade 930 is identified.

Figure 10A:
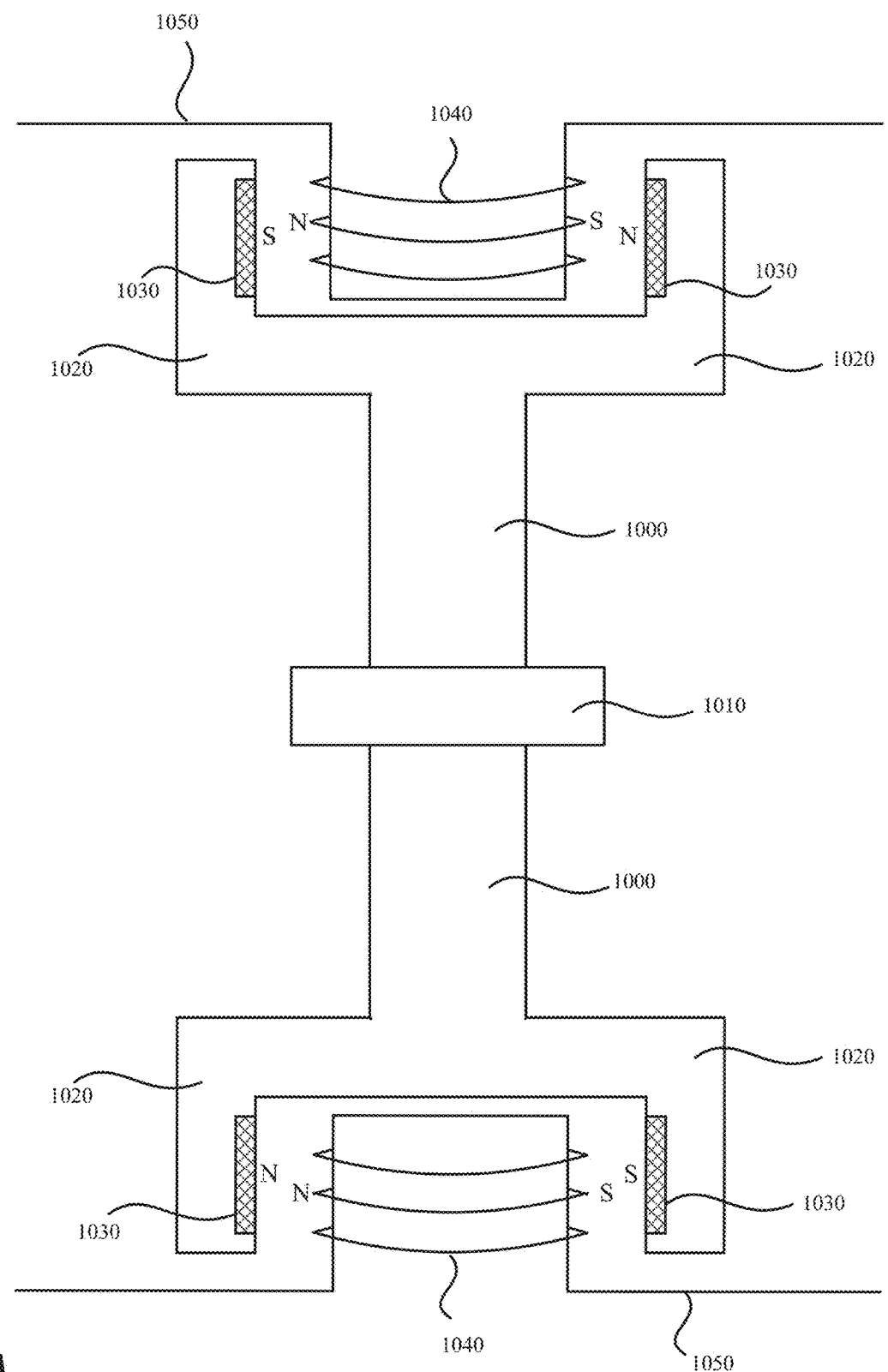
FIGS. 10A-B illustrate cross sectional views of interaction between rotor blades and a stator, according to one embodiment.

FIG. 10A illustrates a cross sectional view of interaction between a bladed rotor and a stator. Blades 1000 of the rotor extend upward and downward from a shaft 1010 that the rotor is mounted to. Each of the blades 1000 splits into two arms 1020 at an end thereof. Each arm has a magnet 1030 secured thereto with the poles of the magnets 1030 being opposite (as illustrated, left upper arm has a south pole and right upper arm has north pole). The arms 1020 are designed to enclose a coil 1040 located on the stator 1050 so that a magnet 1030 with a different polarity passes each side of the coil 1040.

As current flows through the coils 1040 the polarity of the magnetic field created thereby may alternate. When the polarity of the magnets 1030 is opposite from the polarity of the coil 1040, the magnets 1030 are pulled toward the coil 1040 (as would be the case on the upper blade as illustrated) so the blade 1000 moves in that direction. When the polarity of the magnets 1030 is the same as the polarity of the coil 1040, the magnets 1030 are pushed away from the coil 1040 (as would be the case on the lower blade as illustrated) so the blade 1000 moves in that direction. During operation, the coils 1040 may be pushing magnets 1030 having the same polarity while pulling magnets 1030 having different polarities at the same time. The pushing and pulling of the magnets 1030 by the coils 1040 causes the blades 1000 (and accordingly the bladed rotor) to rotate around the shaft 1010. A controller may be utilized to control the current flowing through the coils 1040 and the magnetic field produced thereby to assist in ensuring that the rotor rotates in the desired direction and at the desired speed.

It should be noted that only a single rotor and a single stator coil were illustrated. An electric engine may include a plurality of rotors and an equal plurality of coils (repeat of the arrangement illustrated in FIG. 10A). Alternatively, a configuration may be utilized where the arms of the blades of the rotors are utilized for more than one coil so that the number of rotors and coils is not equal (less rotors than coils).

Figure 10B:
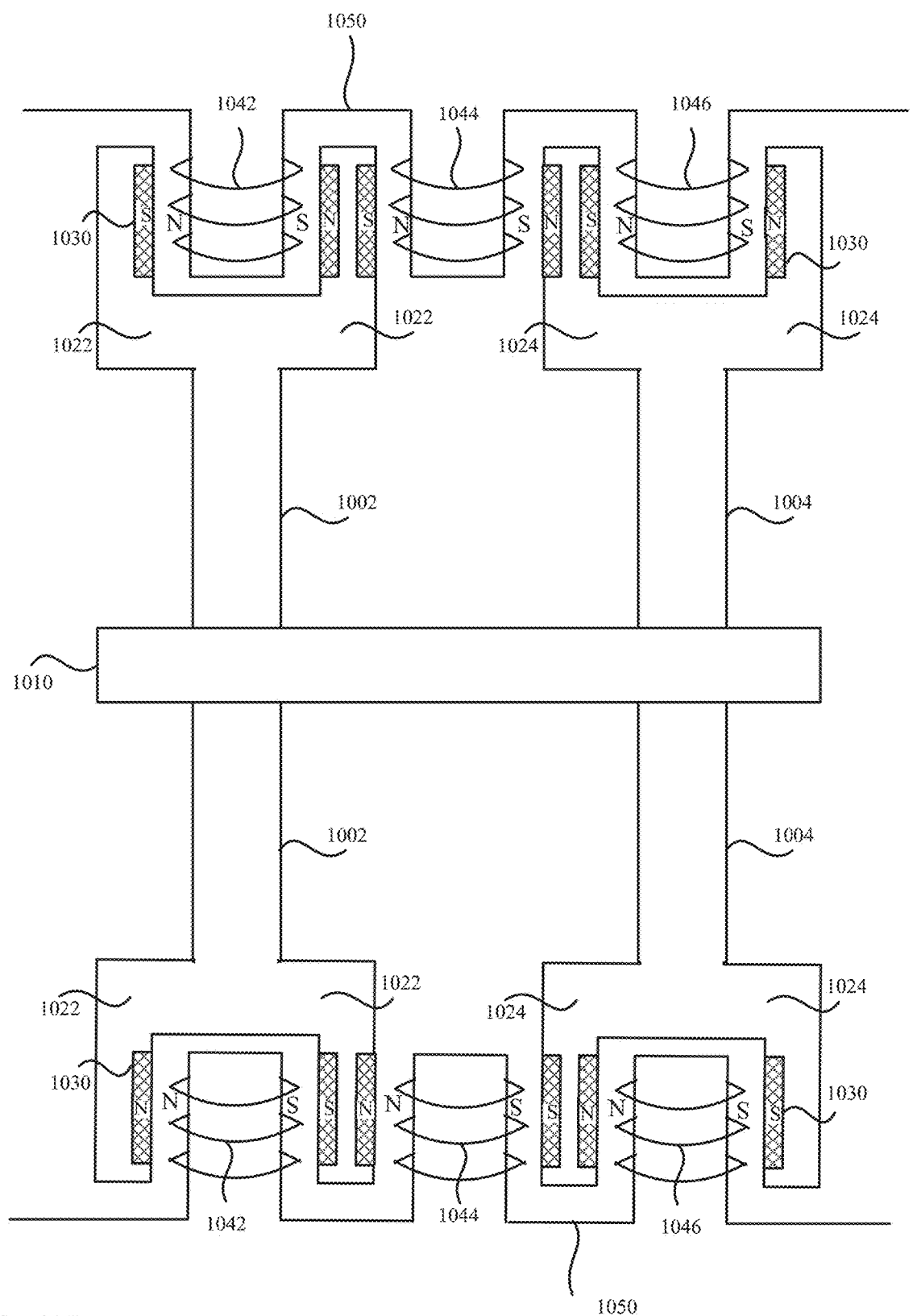

FIG. 10B illustrates a cross sectional view of interaction between a pair of bladed rotors and a stator. Blades 1002, 1004 of a first and second rotor extend upward and downward from the shaft 1010 that the rotors are mounted to. Each of the blades 1002, 1004 split into two arms 1022, 1024 at ends thereof. The stator 1050 includes three coils 1042, 1044, 1046 with the center coil 1044 being located between the blades 1002, 1004 of the first and second rotors. The center facing arms 1022, 1024 (right arm 1022, left arm 1024) include magnets 1030 on each side thereof so that the opposing pole magnets 1030 from two different blades 1002, 1004 interact with the center coils 1044.

Figure 11:
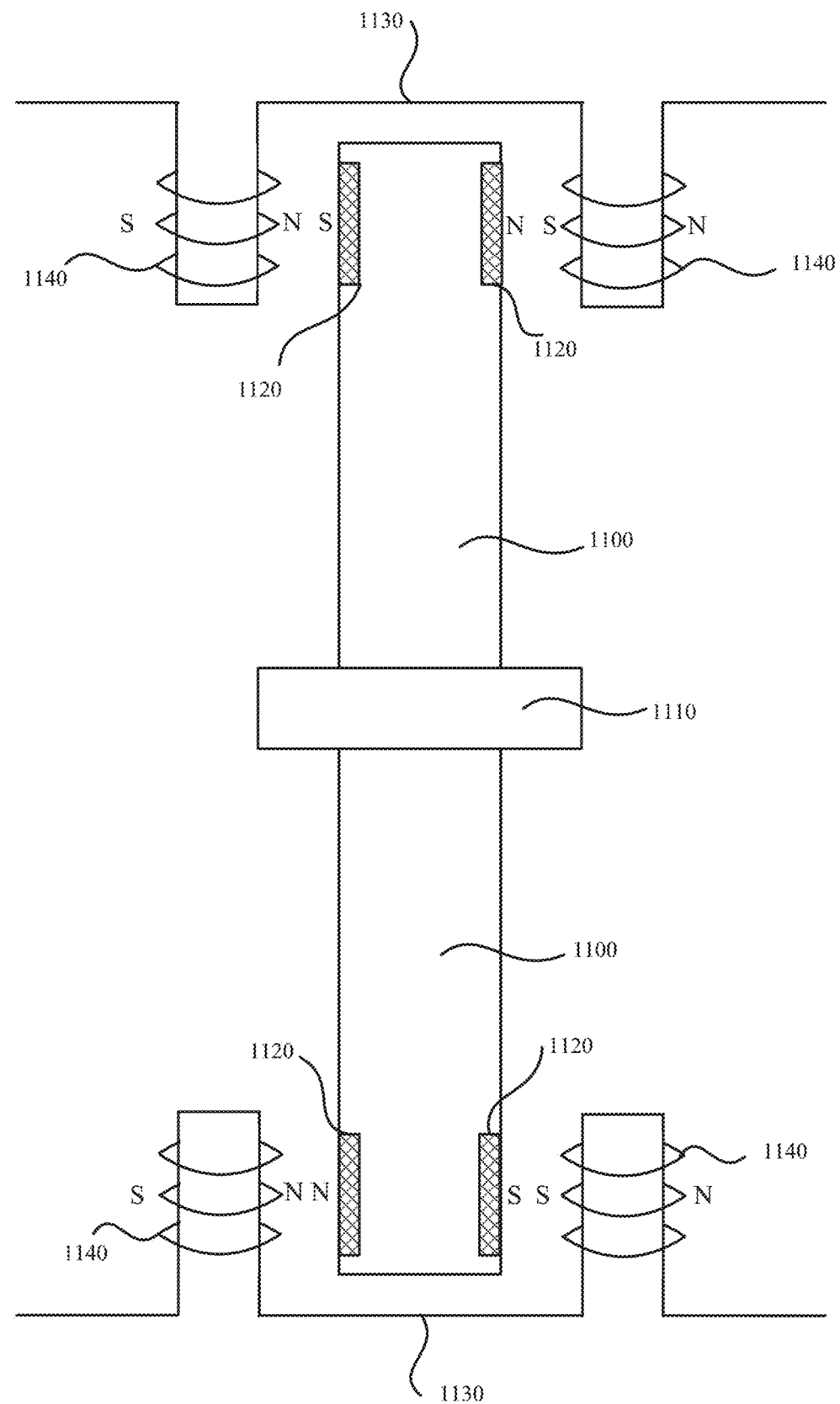
FIG. 11 illustrates a cross sectional view of interaction between rotor blades and a stator, according to one embodiment.

FIG. 11 illustrates a cross sectional view of interaction between rotor blades and a stator. Blades 1100 of the rotor extend upwards and downwards from a shaft 1110 that the rotor is mounted to. The blades 1100 include a magnet 1120 secured to each side of an end thereof, where the poles of the magnets 1120 on each side of the blade 1100 are opposite. The stator 1130 includes a pair of coils 1140 associated with the blades 1100 (the blades 1100 pass through the two coils 1140). As the current flows through the coils 1140 the polarity of the magnetic field created thereby may alternate. The coils 1140 located on each side of the blade 1100 have an opposite polarity. When the polarity of the magnets 1120 is opposite from the polarity of the coils 1140 (upper blade as illustrated), the magnets 1120 are pulled toward the coils 1140 and when the polarity of the magnets 1120 is the same as the polarity of the coils 1140 (lower blade as illustrated), the magnets 1120 are pushed away from the coils 1140. The coils 1140 may be pushing magnets 1120 having the same polarity while pulling magnets 1120 having different polarities at the same time such that the pushing and pulling causes the rotor to rotate. A controller may be utilized to control the current flowing through the coils 1140 to assist in ensuring that the rotor rotates in the desired direction and at the desired speed.

It should be noted that only a single rotor and a corresponding pair of stator coils were illustrated. An electric engine may include a plurality of rotors and a plurality of coils (repeat of the arrangement illustrated in FIG. 11). Alternatively, a configuration may be utilized where a coil located between two rotors may be utilized for both rotors so that there is not two coils per rotor.

Figure 12:
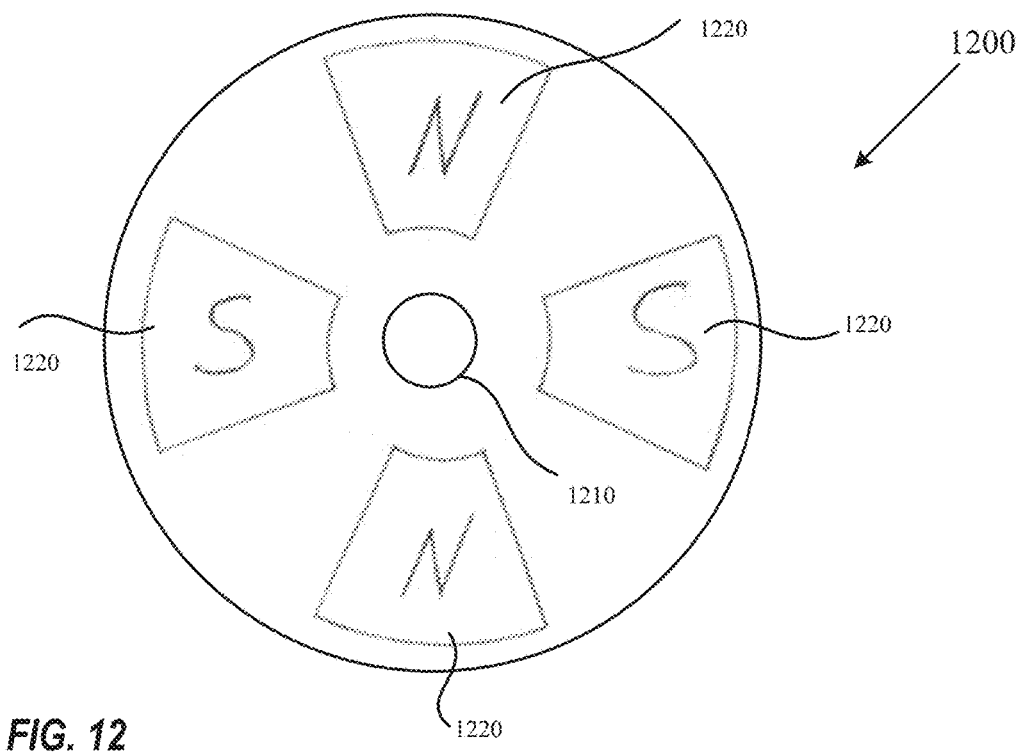
FIG. 12 illustrates an example rotor that could be utilized within a generator, according to one embodiment.

FIG. 12 illustrates an example rotor 1200 that could be utilized within a generator that is utilized with, and possibly within, an electric engine. The rotor 1200 includes a hole 1210 in a center therein for being mounted/connected to a shaft. A plurality of magnets 1220 are spaced around the rotor 1200. The magnets 1220 are equal size and equal strength, spaced apart an equal amount from each other, and the polarity of adjacent magnets is opposite. As illustrated, there are four magnets 1220 that are separated by an amount substantially the same as the size of the magnets 1220. The number of magnets 1220 and spacing between the magnets 1220 is in no way intended to be limited thereto as long as there is an even amount of magnets 1220. It should be noted that if the rotor 1200 was being utilized between stators that magnets 1220 would be located on each side thereof (only one side is visible in FIG. 12). The magnets 1220 on the opposite side of the rotor 1200 would have opposite polarity.

Figure 13:
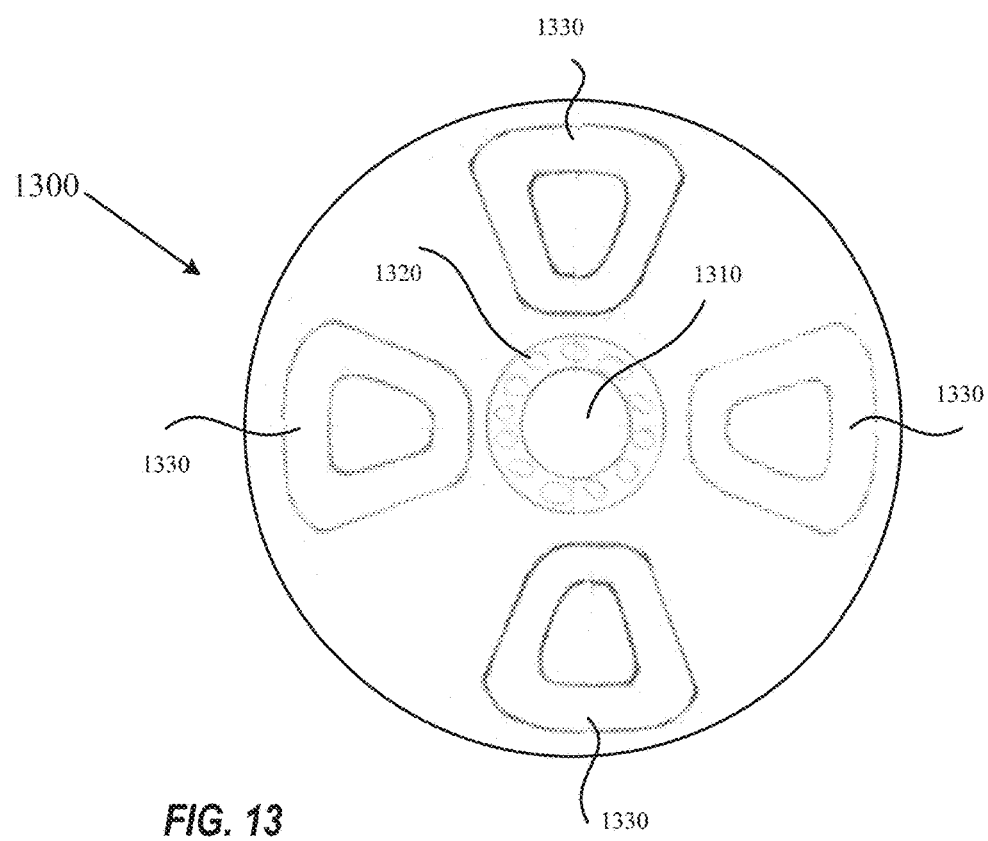
FIG. 13 illustrates an example stator that could be utilized within a generator, according to one embodiment.

FIG. 13 illustrates an example stator 1300 that could be utilized within a generator that is utilized with, and possibly within, an electric engine. The stator 1300 includes a hole 1310 in a center thereof with a bearing 1320 located therewithin. The stator 1300 is mounted to a shaft with the bearings 1320 so that the stator 1300 does not rotate with the shaft (the shaft rotates in the stator 1300). A plurality of coils 1330 are spaced around the stator 1300. The number of coils 1330 and spacing between the coils 1330 is in no way intended to be limited to the example illustrated. Other configurations are within the current scope as long as there is an even amount of coils 1330.

The various jet engine configurations described above are in no way intended to be limited thereto. Rather, various different configurations of an engine and a generator that would be known to those skilled in the art could be utilized without departing from the current scope. Furthermore, while the various engines described above, including those with a co-located generator have been described specifically with regard to electric jet engines, it is not limited thereto. For example, the engines and engines/generators described above could be utilized in a hybrid electric-gas jet engine. Additionally, the engine and/or engine/generator configurations could possibly be used in other electric motor drive systems without departing from the current scope.

Figure 14:
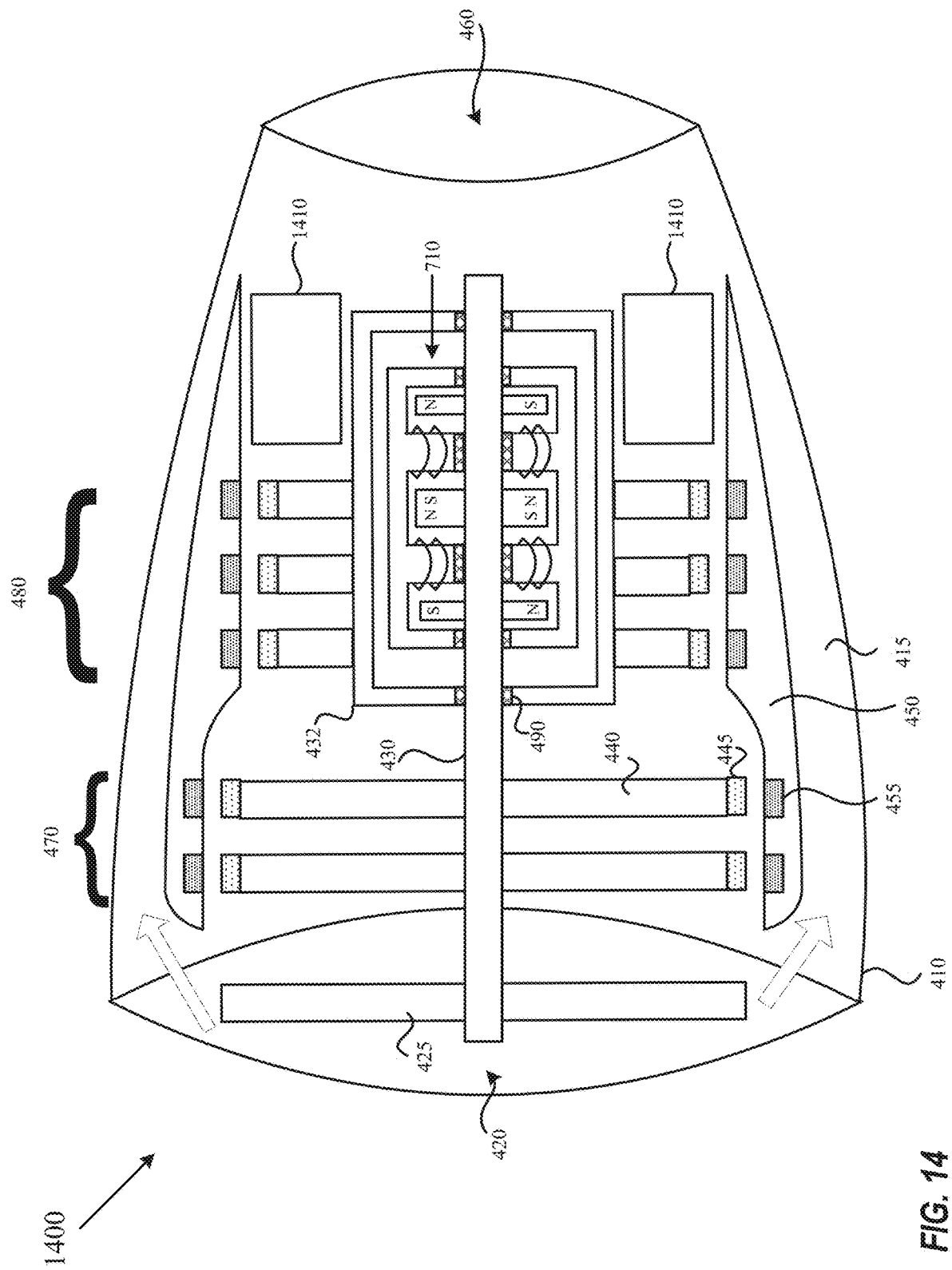
FIG. 14 illustrates a side view of an example hybrid electric-gas jet engine, according to one embodiment.

FIG. 14 illustrates a side view of an example hybrid electric-gas jet engine 1400 including a generator 710. The engine 1400 is similar to the engine 702 of FIG. 7B but includes a combustion chamber 1410 (illustrated as being located above and below the shaft 430) after the second set 480 of rotors (high pressure turbine) and the generator 710 located with the second shaft 432. The air which has been compressed by the low-pressure turbines 470 and the high-pressure turbine 480 is provided to the combustion chambers 1410 and a fuel tank (not illustrated) located, for example, in the jet's wing sprays fuel into the combustion chambers 1410. In the combustion chamber 1410, the fuel mixes with the compressed air and ignites. The burning mixture produces hot exhaust gases (e.g., a temperature of about 1650° F.). A constant flow of air and fuel allows for continuous combustion. The combustion causes a significant expansion of the air and provides more thrust for the jet engine 1400. The use of the electric turbines (low-pressure 470, high-pressure 480) and the combustion chamber 1410 may be a useful combination of electric and gas power for maximum use of the volume, size and power of the engine 1400. The hybrid engine 1400 may also provide good fuel economy.

Figure 1:
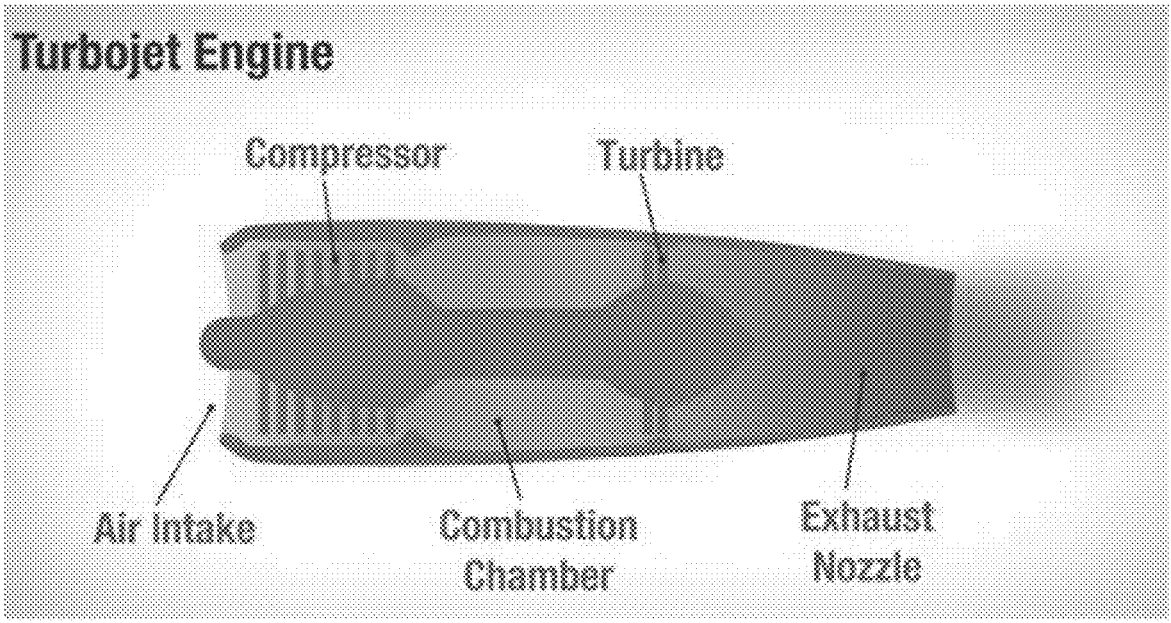
FIG. 1 illustrates a side view of an example gas-powered jet engine known as a turbojet.
Figure 2:
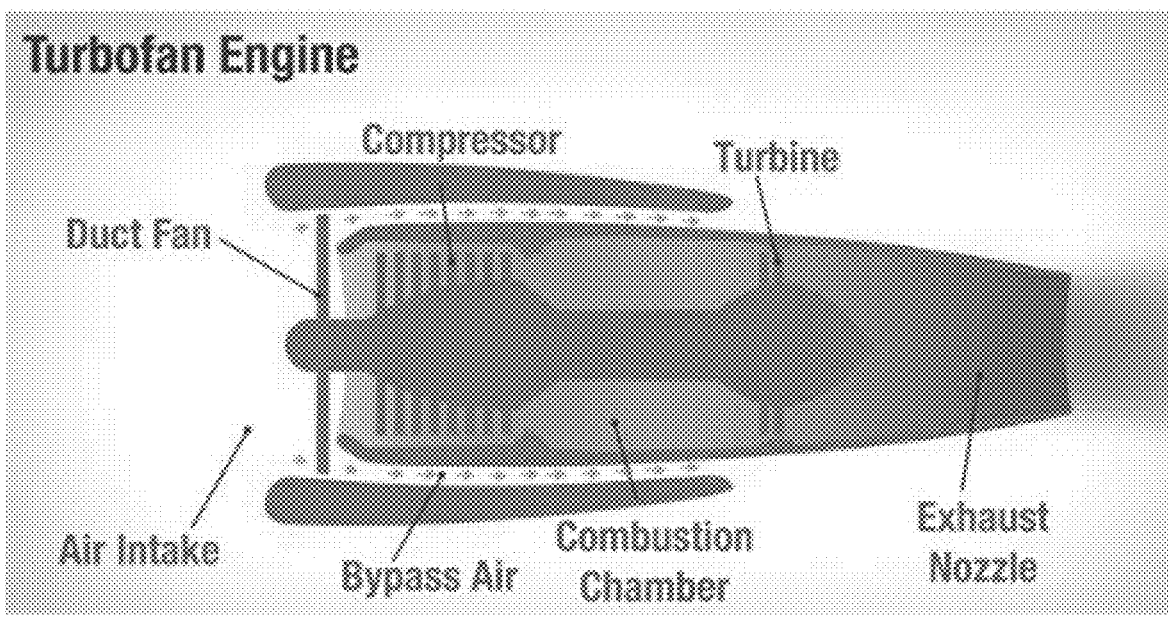
FIG. 2 illustrates a side view of an example gas-powered jet engine known as a turbofan.

The hot exhaust gases need not be applied to a turbine like with the gas engines of FIGS. 1 and 2 as the mechanical energy (rotation of the shaft 430 and the second shaft 432) created by the interaction of the magnets 445 and coils 455 is utilized to turn other objects (e.g., fans 425) and may also be utilized by the generator 710 to convert the mechanical energy to electrical energy. The hot exhaust may be utilized to preheat the fuel provide to the combustion chamber 1410 or for heating of portions of the airplane that may require heating (e.g., heat airplane cabin).

Figure 15:
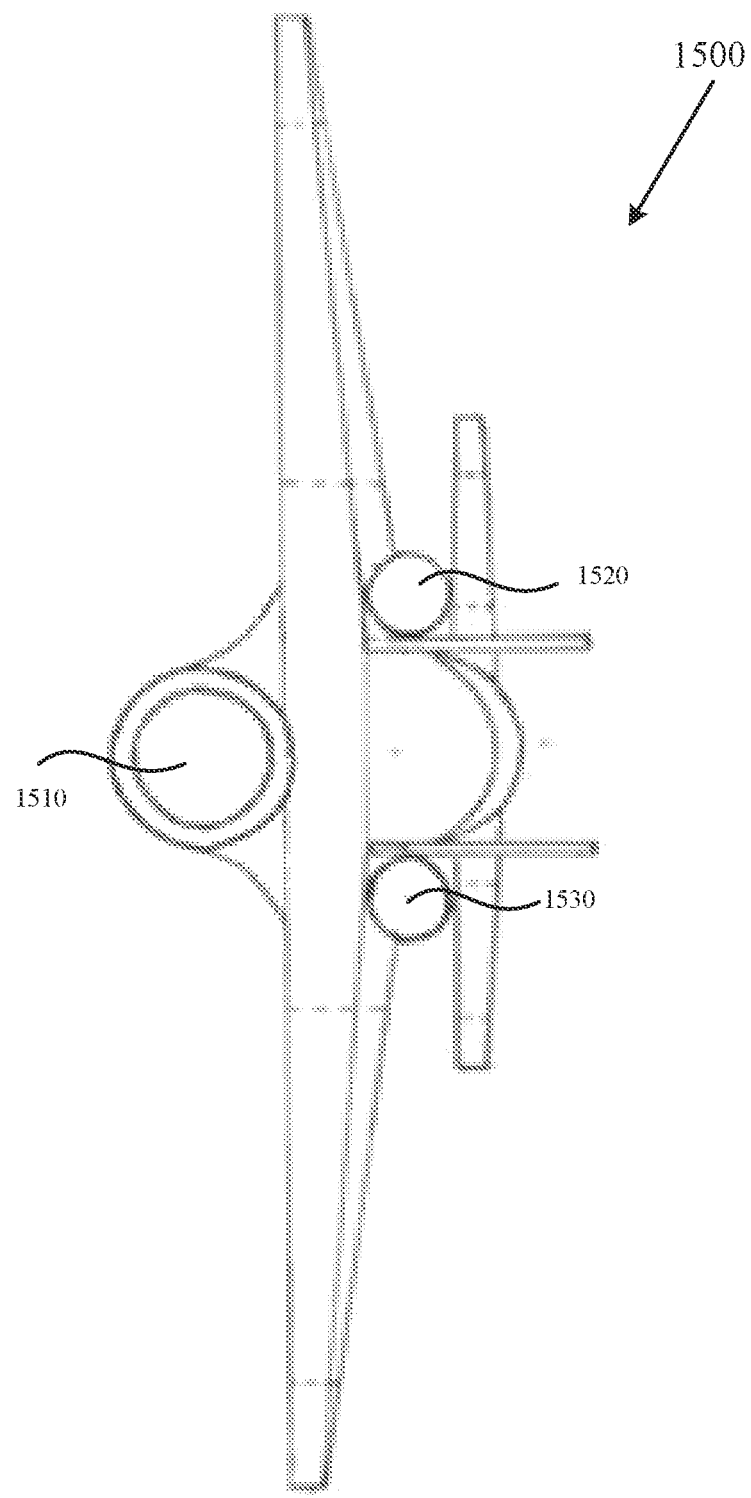
FIG. 15 illustrates an example aircraft utilizing one or more electric motors for thrust, according to one embodiment.

FIG. 15 illustrates an example aircraft 1500 utilizing one or more electric motors for thrust. The aircraft 1500 includes a main engine 1510 on the bottom of the aircraft 1500 and two auxiliary engines 1520, 1530 mounted on wings of the aircraft 1500. All of the engines 1510, 1520, 1530 may be electric engines (e.g., 300, 400, 402, 500, 700, 702), a combination of electric and gas engines may be utilized (e.g., engine 1510 may be gas and engines 1520, 1530 may be electric) or at least one of the engines (e.g., 1510) may be a hybrid electric-gas engine (e.g., 1400).

Figure 16:
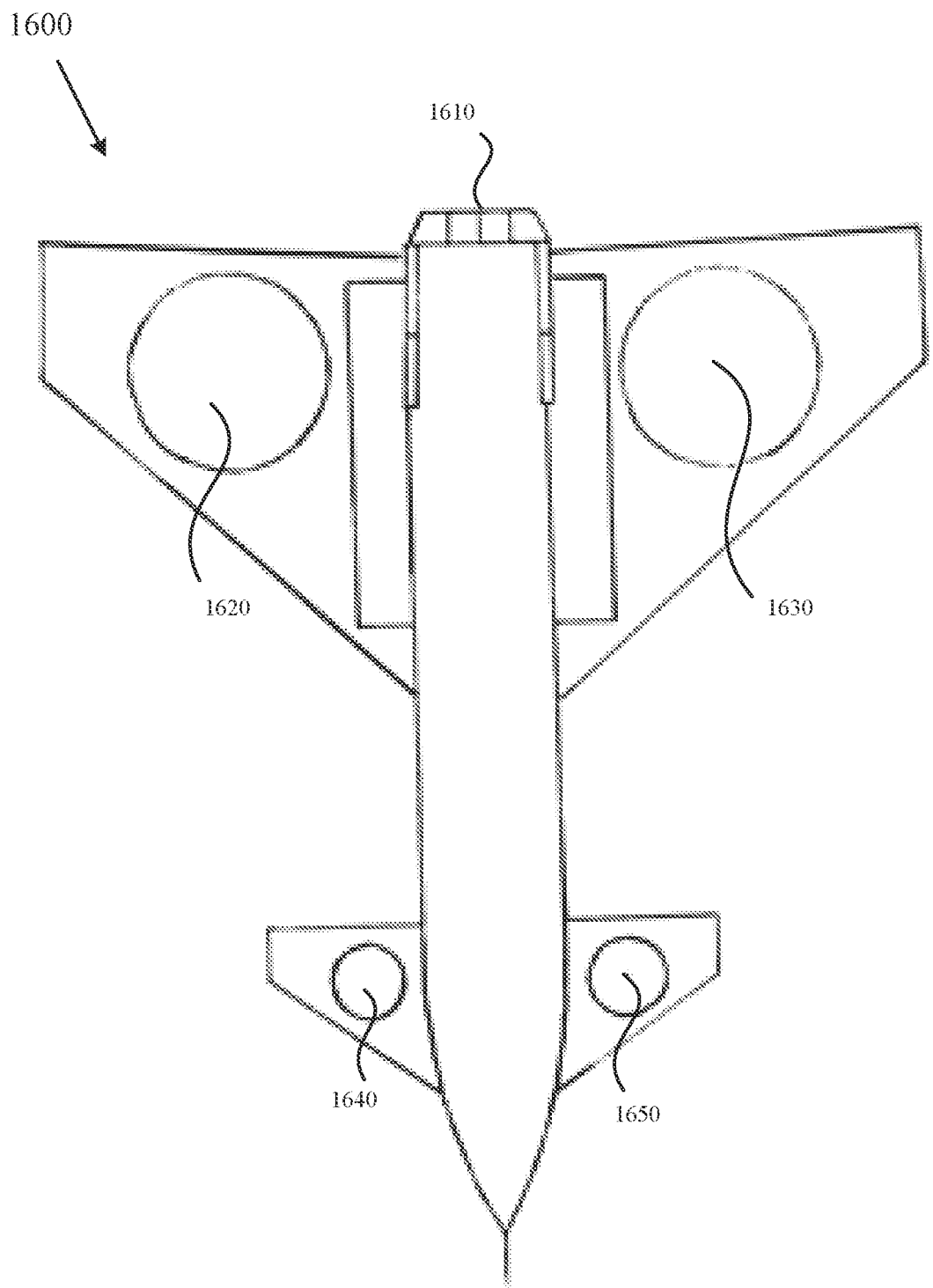
FIG. 16 illustrates an example aircraft utilizing one or more electric motors for hoovering, according to one embodiment.

FIG. 16 illustrates an example aircraft 1600 utilizing one or more electric motors for thrust and/or hoovering. The aircraft 1600 includes a main engine 1610 on the bottom of the aircraft 1600 and two auxiliary engines 1620, 1630 mounted horizontally within a back wing and two auxiliary engines 1640, 1650 mounted horizontally within a front wing. The main engine 1610 provides the thrust for the aircraft 1600 while the auxiliary engines 1620, 1630, 1640, 1650 enable the aircraft 1600 to hoover. All of the engines 1610, 1620, 1630, 1640, 1650 may be electric engines (e.g., 300, 400, 402, 500, 700, 702), a combination of electric and gas engines may be utilized (e.g., engine 1610 may be gas and engines 1620, 1630, 1640, 1650 may be electric) or at least one of the engines (e.g., 1610) may be a hybrid electric-gas engine (e.g., 1400).

Although the disclosure has been illustrated by reference to specific embodiments, it will be apparent that the disclosure is not limited thereto as various changes and modifications may be made thereto without departing from the scope. The various embodiments are intended to be protected broadly within the spirit and scope of the appended claims.

The invention claimed is:

1. An electric jet engine, said electric jet engine comprising:
a housing;
an air inlet;
a shaft;
at least one bladed rotor secured on the shaft, wherein the at least one bladed rotor includes a plurality of blades, wherein ends of the plurality of blades branch into a first arm and a second arm separated by an opening;
a first plurality of magnets mounted on the first arm and the second arm of the at least one bladed rotor, wherein a polarity of the magnets on the first arm and the second arm are opposite;
a first plurality of coils positioned so as to pass through the opening in the plurality of blades of the at least one bladed rotor and interact with the first plurality of magnets, wherein the interaction between the first plurality of coils and the first plurality of magnets causes the at least one bladed rotor to rotate in order to pressurize and accelerate air received via the air inlet; and
an exhaust nozzle to expel the pressurized and accelerated air to provide thrust.

2. The electric jet engine of claim 1, further comprising a power source to power the first plurality of coils.

3. The electric jet engine of claim 1, further comprising a controller to control operation of the first plurality of coils.

4. The electric jet engine of claim 1, wherein the first plurality of coils are formed in an interior of the housing.

5. The electric jet engine of claim 1, further comprising a stator, wherein the first plurality of coils are formed in the stator.

6. The electric jet engine of claim 5, further comprising ducts formed between the stator and the housing; and
a ducted fan within the air inlet to route some of the air received via the air inlet to the ducts, wherein rotation of the ducted fan is supplied by rotation of the shaft.

7. The electric jet engine of claim 1, wherein the polarity of the magnets mounted on adjacent blades of the plurality of blades is opposite.

8. The electric jet engine of claim 1, wherein the at least one bladed rotor includes at least one first rotor secured to the shaft that rotates the shaft and at least one second rotor secured to a bearing that enables rotation around the shaft.

9. The electric jet engine of claim 1, further comprising at least one additional fan located within the housing to route the pressurized and accelerated air to the exhaust nozzle, wherein rotation of the at least one additional fan is provided by rotation of the shaft.

10. The electric jet engine of claim 1, wherein the shaft extends out of the air inlet so as to be external to the housing and further comprising a propeller mounted to the shaft external to the housing, wherein the propeller extends further than the housing, and wherein the rotation of the at least one bladed rotor rotates the shaft which in turn rotates the propeller and causes the propeller to route and accelerate air around the housing.

11. The electric jet engine of claim 1, further comprising a generator connected to the shaft to produce electric energy from rotation of the shaft.

12. The electric jet engine of claim 11, wherein the generator includes a stator secured to the shaft via bearings and a plurality of rotors secured to the shaft so as to rotate with the shaft, wherein the stator includes a second plurality of coils and the plurality of rotors include a second plurality of magnets and rotation of the magnets past the coils causes current to flow and produces the electric energy.

13. An electric jet engine, said electric jet engine comprising:
a housing;
an air inlet;
a first shaft;
a second shaft connected to the first shaft via bearings;
a first bladed rotor secured on the first shaft, wherein the first bladed rotor includes a plurality of blades, wherein ends of the plurality of blades branch into a first arm and a second arm separated by an opening;
a first plurality of magnets mounted on the first arm and the second arm of the first bladed rotor, wherein a polarity of the magnets on the first arm and the second arm are opposite;
a second bladed rotor secured on the second shaft, wherein the second bladed rotor includes a plurality of blades, wherein ends of the plurality of blades branch into a first and a second arm separated by an opening;

a second plurality of magnets mounted on the first arm and the second arm of the second bladed rotor, wherein a polarity of the magnets on the first arm and the second arm are opposite;

a stator having a first plurality of coils positioned so as to pass through the opening in the plurality of blades of the first bladed rotor and the second bladed rotor in order to interact with the plurality of magnets on the first bladed rotor and the second bladed rotor, wherein the interaction between the first plurality of coils and the first and second plurality of magnets causes the first bladed rotor and the second bladed rotor to rotate in order to pressurize and accelerate air received via the air inlet; and an exhaust nozzle to expel the pressurized and accelerated air to provide thrust.

14. The electric jet engine of claim 13, further comprising ducts formed between the stator and the housing; and a ducted fan within the air inlet to route some of the air received via the air inlet to the ducts, wherein rotation of one of the first shaft or the second shaft is utilized to rotate the ducted fan.

15. The electric jet engine of claim 13, further comprising a generator, wherein the generator includes a stator secured to the first shaft via bearings and a plurality of rotors secured to the first shaft so as to rotate with the first shaft, wherein the stator includes a second plurality of coils and the plurality of rotors include a third plurality of magnets and rotation of the magnets past the coils causes current to flow and produces electric energy.

16. The electric jet engine of claim 15, wherein the second shaft is hollow and the generator is connected to the first shaft within the second shaft.

* * * * *